(12) United States Patent
Ully

(10) Patent No.: US 6,581,149 B2
(45) Date of Patent: Jun. 17, 2003

(54) DATA CARRIER HAVING ADDRESS MODE OR COMMAND EXTENSION CAPABILITY

(75) Inventor: Klaus Ully, Graz (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/814,392

(22) Filed: Mar. 21, 2001

(65) Prior Publication Data

US 2001/0037439 A1 Nov. 1, 2001

(30) Foreign Application Priority Data

Mar. 21, 2000 (EP) .......................................... 00890089

(51) Int. Cl.⁷ ............................................. G06F 12/00
(52) U.S. Cl. ........................ 711/200; 711/115; 711/219; 711/221
(58) Field of Search ................................ 711/205, 219, 711/221, 115, 200; 235/389, 492

(56) References Cited

FOREIGN PATENT DOCUMENTS

EP          0913766 A2    10/1998

OTHER PUBLICATIONS

M.H. Konijnenburg et al, "Testability of the Philips 80C51 Micro–Controller", Sep. 1999. pp. 820–829.

*Primary Examiner*—Hiep T. Nguyen
(74) *Attorney, Agent, or Firm*—Daniel J. Piotrowski

(57) ABSTRACT

A data carrier is disclosed for the communication of transmission information to a communication station. In particular, the data carrier includes a program memory for storing a program code including instruction and address information in at least one program code line, a data memory for storing data information, and a processor for processing the communicated transmission information, wherein each program code line address mode information included in the instruction information and the associated address information can be determined/processed to access a memory location of the program or data memory, and includes an address mode extension device, which in the presence of specific address information, determines stored additional address mode information.

7 Claims, 2 Drawing Sheets

DATA CARRIER HAVING ADDRESS MODE OR COMMAND EXTENSION CAPABILITY

BACKGROUND OF THE INVENTION

The invention relates to a data carrier and an integrated circuit.

Such a data carrier is known from the document WO99/50738 and takes the form of a transponder of a smart card. The known data carrier is adapted to communicate transmission information to or from a communication station. In order to process and store transmission information received by communication device of the data carrier the known data carrier has program memory, data memory and computing module.

The program memory stores the program code of a processing program which defines the functionality of the transponder. The computing modules are adapted to read the program codes stored in the program memory and to execute the processing program. Transmission information received by the communication device is then processed in accordance with the processing program and is stored, if applicable, in the data memory as data information. Likewise, data information stored in the data memory can be processed by the computing module in accordance with the processing program and can be transmitted to the communication station by the communication device as transmission information.

The program code includes program code lines which each include instruction information and, if applicable, address information and data information. The instruction information includes command information and, if applicable, address mode information. The address mode information and the address information identify a memory location of the program memory or the data memory.

It has been found that the known data carrier has the drawback that the computing module (for example a 80C51 processor) allow only a very limited number (for example 256) of instruction information units to be used. For the programmer of the program codes both the commands executable by the computing modules and the address modes executable by the computing module for access to a memory location are dictated by the limited number of instruction information units, which number is determined almost wholly by the manufacturer of the computing module. This has the drawback that an optimization of the instruction information for the relevant functionality of a transponder, in order to achieve a most efficient program code, which saves both memory space and computing time and also precludes a high power consumption of the transponder, is virtually impossible.

For these computing module tools necessary for drawing up the program code (for example assemblers, compilers, emulators) are available but these can be utilized only in the case of compliance with the instruction information laid down by the manufacturer of the computing means. Since a modification of these tools would involve a substantial effort a change of the instruction information is substantially impossible for economic reasons.

Moreover, a change of the instruction information in order to optimize the program code would have the drawback that previous program codes, which already may have been in use for years and which are therefore highly reliable, cannot be used as part of a new program code because the code of the modified instruction information would have another meaning.

SUMMARY OF THE INVENTION

It is an object of the invention to provide a data carrier and an integrated circuit in which the program code can be optimized by means of additional commands or address modes and which in spite of this allow the continued use of existing instruction information and tools. This object of enabling additional address modes to be obtained is achieved by means of the measures defined in the characterizing part of claim 1 in the case of a data carrier as defined in the opening part of claim 1 and by the measures defined the characterizing part of claim 7 in the case of an integrated circuit as defined in the opening part of claim 7.

Thus, it is achieved that in the case of specific address information included in a program code line additional hardware, i.e. address mode extension module, is activated which determines additional address mode information stored in the data memory or the program memory, which address mode information is characteristic of a further address mode not available in the instruction information provided by the manufacturer of the computing module. Depending on the address mode thus determined the address mode extension module determine additional address information with which the data memory or program memory can be accessed by an access stage and the data information thus determined is supplied to the computing module.

Making further address modes possible has the advantage that further possibilities are obtained for optimizing the program codes for the data carrier and, in addition, enables the tools offered with the computing module to be used because the further address modes are characterized by specific address information and not by additional instruction information.

It is to be noted that address extension module for computing module are known from the document U.S. Pat. No. 5,918,243, which include ten registers and ten offset registers, each register having an associated offset register. When the address information which characterizes one of these registers is included in a program code line executed by the computing module, the address information stored in the offset register is added to the address information stored in the register so as to determine additional address information. However, this program code line executed by computing module should include additional address mode information in the instruction information in order to achieve the addition of the address information stored in the register and that in the offset register.

However, this leads to the afore-mentioned drawback that this additional address mode information would have to be included for different command information and would require a large amount of additional instruction information, which has the disadvantage that the available tools cannot be used for such a program code to be executed by the computing module.

According to one aspect of the invention, it possible for the address mode extension module to determine the program memory or data memory designated for the access by analysis of the detected additional address mode information. This is particularly advantageous when address information identifies a memory location in the program memory as well as another memory location in the data memory.

According to another aspect of the invention it possible that, for example, the third entry in an address information table is identified by the additional address mode information, upon which the address information in this third entry of the address information table is used as additional address information for the access to a memory location. Likewise, the additional address information ZAI determined by an addition of this address information AI in the third entry of the address information table to address information AI included in the program code line PCZ could be used for the access to a memory location. These additional address modes could provide a further optimization of the program code PC.

Yet another aspect of the invention is to enable address modes for the optimization of the program code to be obtained. For example, additional address mode information may identify an address mode in which an address decrementing operation is performed only after a read access.

Thus, it is achieved that for specific address information included in a program code line additional hardware, i.e. command extension means, is activated, which additional hardware determines additional command information stored in the data memory means or the program memory means and identifying a further additional command not available in the instruction information provided by the manufacturer of the computing means. For example, the register content or the count of the program counter of the computing means are changed in accordance with the detected additional command, in order to give the computing means an additional functionality during the processing of the command information of one of the following program code lines.

The fact that additional commands are possible has the advantage that further possibilities of optimizing the program code for the data carrier and, in addition, the tools available for the computing means can be used because the additional commands are identified by specific address information and not by additional instruction information.

BRIEF DESCRIPTION OF THE DRAWINGS

The invention will now be described in more detail with reference to the drawings, which show two embodiments given by way of example but to which the invention is not limited.

DETAILED DESCRIPTION OF THE INVENTION

Figure 1:
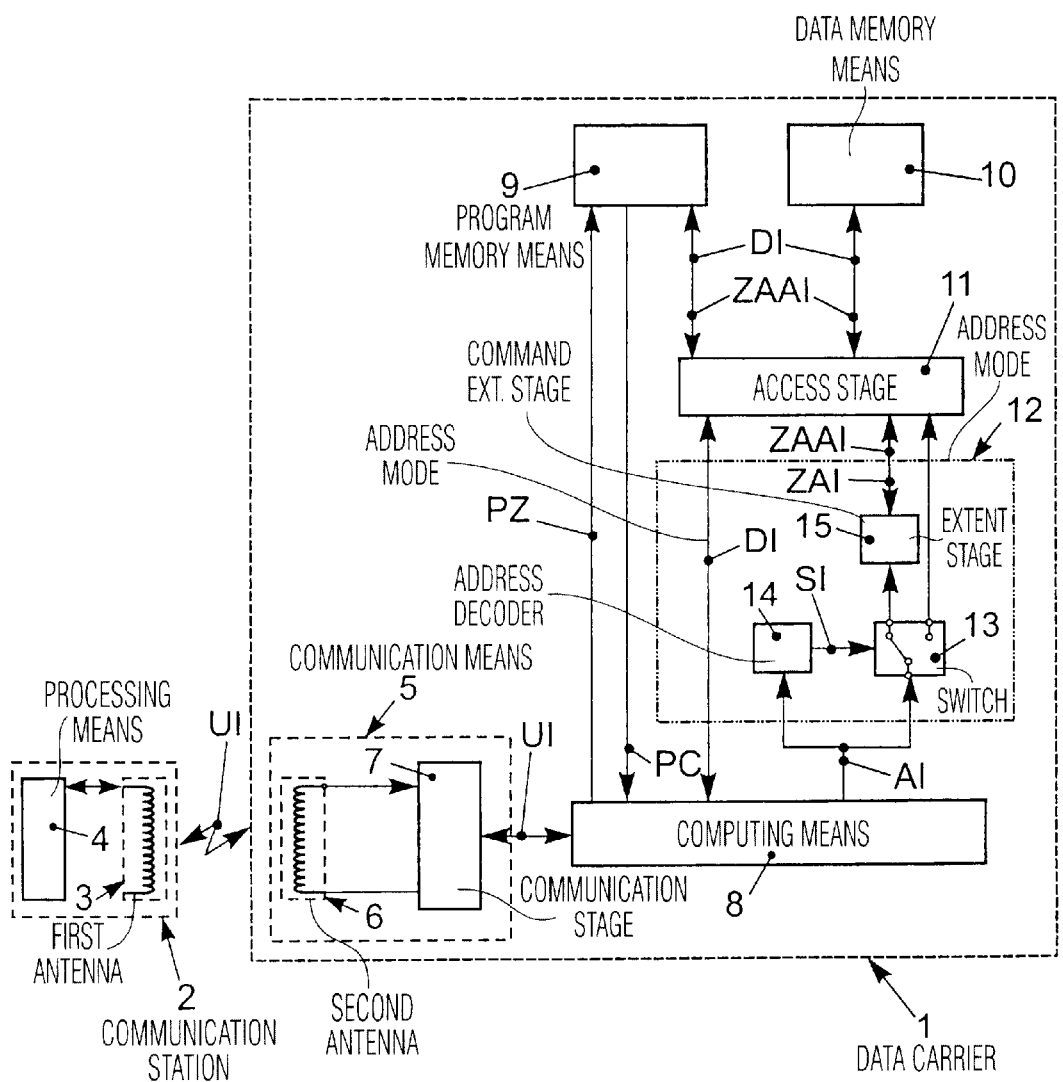
FIG. 1 is a block diagram of a data carrier provided with address mode extension module in order to enable additional address modes to be obtained.

FIG. 1 shows a data carrier 1 and a communication station 2, which are adapted to communicate transmission information U1. During communication the communication station 2 can transfer transmission information U1 to the data carrier 1, which transmission information is processed in the data carrier 1 and, if required, is stored as data information DI. It is likewise possible that during communication data information DI stored in the data carrier 1 is processed by the data carrier 1 and is transferred to the communication station 2 as transmission information UI.

To communicate and to process the transmission information UI the communication station 2 has a first antenna 3 and processing modules 4. To convey the transmission information UI the data carrier 1 has communication means 5, which include a second antenna 6 and a communication stage 7. In a receive mode, when transmission information UI is received, the communication stage 7 is adapted to demodulate the transmission information IU and to supply the demodulated transmission information UI to computing module 8 of the data carrier 1. In a transmit mode the communication stage 7 is adapted to modulate the transmission information UI supplied to the communication stage 7 by the computing module 8 and to apply the modulated transmission information UI to the second antenna 6.

The data carrier 1 further includes a voltage supply stage, a processing clock generation stage as well as further stages which are customary for contactless communication with the communication station 2 and which are not shown in FIG. 1 because they are not relevant to the invention.

The data carrier 1 further includes program memory 9 for the storage of a program code PC including instruction information II and associated address information AI in at least one program code line PCZ. The program memory 9 of the data carrier 1 is formed by a so-called ROM (Read Only Memory).

The data carrier 1 in addition includes data memory 10 formed by a so-called RAM (Random Access Memory). Both the memory locations of the program memory means 9 and the memory locations of the data memory 10 can be addressed by 16 bit address information AI, which is why the program memory 9 and the data memory 10 have a memory sector of 64 kbytes each. A part of the data memory 10 can also be addressed as a direct access data memory by address information AI having only 8 bits.

Figure 2:
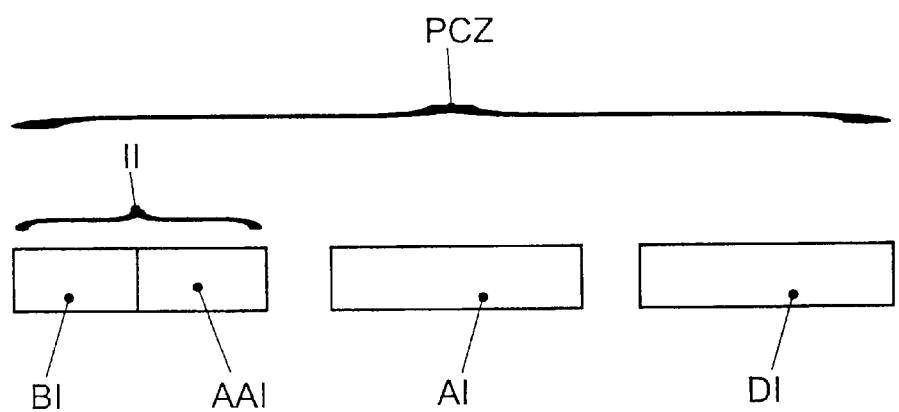
FIG. 2 symbolically shows the structure of the information included in a program code line of a program code stored in program memory of the data carrier shown in FIG. 1.

FIG. 2 symbolically shows the structure of the information included in one of the program code lines PCZ of the program code PC stored in program memory 9. Each program code line PCZ of the program code PC contains at least the instruction information II, which includes at least one item of command information BI. The instruction information II, which includes at least one item of command information BI, may be formed, for example, by the command information BI="NOP" (No Operation), which is used for programming a waiting operation of the computing module 8.

However, in addition to the instruction information II, a program code line PCZ of the program code PC may also include address information AI. In that case the instruction information II includes both the command information BI and address mode information AAI. The address mode information AAI specifies the mode of addressing a memory location by the address information AI. Both the so-called direct addressing and the so-called indirect addressing are known to those skilled in the art. It is to be noted that address mode information AAI may also be included in instruction information II of a program code line PCZ without any address information AI.

In addition to the instruction information II and address information AI, a program code line PCZ may further include data information DI. Such a program code line PCZ is formed by, for example, the program code line PCZ= "MOV A, #10". Here, the command "MOV" forms instruction information II, the designation "A" of the memory location of an accumulator forms address information AI, and the numerical value "10" forms data information DI. During processing of this program code line PCZ by the computing module 8 the numerical value "10" is loaded into the accumulator "A".

The computing module 8 of the data carrier 1 are formed by the microprocessor 80C51, which is known to those skilled in the art. A multitude of other similar microprocessors suitable for use as computing module 8 in the data carrier 1 are known to those skilled in the art. However, common to all these computing means is that the manufacturers of such computing module define a command set (number and type of possible commands) and the possible address modes for addressing the program memory 9 or the data memory 10 and all the possible instruction information II which can then be processed by the computing module. For example, for the microprocessor 80C51 256 different items of instruction information II are defined and are possible.

For such computing tools (for example assemblers, compilers, emulators, . . . ) are made available in order the facilitate the work of programmers who draw up and test the program code PC for the computing means. However, these tools can be utilized only if the instruction information II laid down by the manufacturer is used without any changes. In practice, this often has the consequence that a programmer cannot optimize the program code PC of the data carrier 1 for the situation in which the data carrier 1 is used, in order to obtain a program code PC which is as efficient as possible and which saves both memory space and computing time and also precludes a high power consumption of the data carrier 1.

The computing module 8 include inter alia a program count register into which the numerical value "0" is loaded as the program count PZ after a reset of the computing module 8 at the beginning of a communication with the communication station 2. After this instant the program count PZ is each time incremented by "1" in accordance with the processing clock rate of the computing module 8. The computing means 8 are adapted to transfer the numerical value of the respective program count PZ to the program memory 9 and to read out the program code line PCZ of the program code PC stored in the program memory 9, which program code line corresponds to the respective program count PZ.

Subsequently, the computing module 8 process the program code line PCZ thus read out. Depending on the information present in a program code line PCZ the address mode information AAI included in the instruction information II of the program code line PCZ and the associated address information AI included in this program code line PCZ is determined and is processed in order to access a memory location.

The data carrier 1 further has an access stage 11 which can receive the address information AI and, if applicable, the data information DI. Depending on the address information AI applied to the access stage 11 by the computing module 8 the access stage 11 can access a memory location of the program memory 9 as well as a memory location of the data memory 10. During the write access the computing module 8 can supply the data information DI to be written or stored in a memory location to the access stage 11 and can be applied from the access stage 11 to the program memory 9 or the data memory 10. During the read access data information DI read out of the program memory 9 or the data memory 10 by the access stage 11 can be supplied to the computing module 8.

The data carrier 1 now has address mode extension module 12, which include a switch 13, an address decoder 14, and an address mode extension stage 15. Address information AI supplied by the computing module 8 when the program memory 9 or the data memory 10 are accessed can be applied to the switch 13 and to the address decoder 14.

The address decoder 14 is adapted to detect specific address information AI and to supply, upon detection of this specific address information AI, switch information SI to the switch 13. In the present example this specific address information is AI="80". In the absence of the switch information SI the switch 13 is arranged to supply the address information AI applied to this switch to the access stage 11 and, when the switch information SI is present, to supply the applied address information AI to the address mode extension stage 15.

When the switch 13 has transferred the address information AI to the address mode extension stage 15 the address mode extension stage 15 is adapted to read additional address mode information ZAAI stored in a function register FR and to read address information AI stored in an address register AR. As a result of evaluation of the additional address mode information ZAAI and the address information AI read from the address register AR the address mode extension stage 15 is adapted to determine additional address information ZAI for the access to memory locations of the program memory 9 or the data memory 10, as will be described in greater detail hereinafter.

Figure 3:
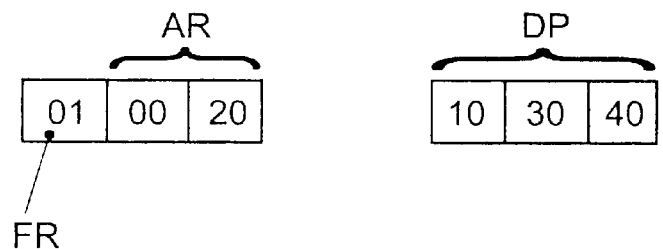
FIG. 3 shows certain memory locations of data memory of the data carrier shown in FIG. 1.

FIG. 3 shows memory locations of the data memory 10, one memory location with the address information AI="5" forming the function register FR and storing the numerical value "01" and two memory locations with the address information AI="06" and AI="07" forming the address register AR for the 16-bit addresses and storing the numerical value "0020". Three further memory locations of the data memory means 11 form a data buffer, have the address information AI="0020", "0021" and "0022" and store the numerical values "10", "30" and "40".

The mode of operation of the data carrier 1 shown in FIG. 1 will be explained hereinafter with reference to two examples of use. In the first example of use it is assumed that the desired mode of operation of the data carrier 1 requires a program code PC having at least two program code lines PCZ, by means of which the numerical values each time stored in the three memory locations of the data buffer DP of the data memory 10 should be added. This requires a particularly effective address mode of the memory locations of the data buffer DP. With the address mode extension means 13 this task can be fulfilled by means of the only six program code lines PCZ given hereinafter, whose processing by the computing module 8 is explained hereinafter.

PCZ1: MOV FR, #01
PCZ2: MOV ARL, #20
PCZ3: MOV ARH, #00
PCZ4: MOV A, 80
PCZ5: ADD A, 80
PCZ6: ADD A, 80

When the first program code line PCZ1 in the program memory 9 is loaded by the computing module 8 and is executed by the computing means 8, the numerical value "01" is loaded into the function register FR. The computing means 8 then supply the address information AI="05" of the function register FR to the address mode extension module 12 and supply the data information DI="01" to the access stage 11. Since the address information AI="05" is not a specific address information AI the address decoder 14 does not supply any switch information SI to the switch 13, for which reason the address information AI="05" is applied to the access stage 11. The access stage 11 subsequently loads the numerical value "01" in the function register FR with address information AI="05" into the data memory 10.

The numerical value "01" in the function register FR identifies a first additional address mode of the address mode extension means 12, in which after the access to the addressed memory location by the access stage 11 the numerical value "01" is added to the numerical value stored in the address register AR, which will be explained hereinafter.

During the subsequent execution of the second program code line PCZ2 the numerical value "20" is stored into the less significant byte of the address register AR and during the execution of the third program code line PCZ3 the numerical value "00" is stored in the more significant byte of the address register AR.

In the known address mode of the microprocessor 80G51 the numerical value stored in the memory location of the data memory 10 with the address information AI="80" would be loaded into the accumulator A of the computing 8 during the subsequent execution of the fourth program code line PCZ4. However, in the present example the address information AI="80" is detected by the address decoder 14 as specific address information AI and the switch information SI is supplied to the switch 13.

Subsequently the address information AI="80" is applied to the address mode extension stage 15. At the beginning of this address information AI the address mode extension stage 15 reads the numerical value "01", stored in the function register FR as additional address mode information ZAAI, with the aid of the access stage 11. The numerical value "01" identifies the first additional address mode described hereinbefore, upon which the address information AI="0020" stored in the address register AR is supplied unchanged to the access stage 11 as additional address information ZAI in order to read the numerical value stored in this memory location of the data buffer DP. The access stage 11 subsequently detects the numerical value "10" stored in the memory location with the address information AI="0020" and applies this to the computing means 8 as data information DI="10". The computing module 8 store this data information DI="10" in the accumulator A.

During the execution of the first additional address mode, after the address information AI stored in the address register AR has been applied to the access stage 11, the address mode extension stage 15 adds the numerical value "01" to the address information AI stored in the address register AR and loads this numerical value "0021" into the address register AR. The address register AR consequently contains the numerical value "0021" after the first execution of the first additional address mode.

As a result of this, it is advantageously achieved that, by the address mode extension stage 12 in the first additional address mode, instruction information II="MOV Register, Address X" defined by the manufacturer of the computing module 8 does not give access to the memory location with the address information AI="Address X" but to another memory location whose address information AI is stored in the address register AR. A particularly advantageous feature is the incrementation of the address information AI in the address register AR after the read access by the access stage 11, the access to the next memory location of the data buffer thus being prepared for already.

During the execution of the fifth program code line PCZ5, in accordance with the processing described hereinbefore, the numerical value "30" stored in the memory location with the address information AI="0021" is added to the numerical value "10" stored in the accumulator A, upon which the numerical value "40" is loaded into the accumulator A. After the address information AI="0021" read out of the address register AR has been supplied to the access stage 1 the address mode extension stage 15 adds the numerical value "01" to the address information AI="0021" and the address information AI="0021" is loaded into the address register AR.

During the execution of the sixth program code line PCZ6, in accordance with the processing described hereinbefore, the numerical value "40" stored in the memory location with the address information AI="0022" is added to the numerical value "40" stored in the accumulator A, upon which the numerical value "80" is loaded into the accumulator A. After the address information AI="0022" read out of the address register AR has been supplied to the access stage 11 the address mode extension stage 15 adds the numerical value "01" to the address information AI="0622" and the address information AI="0023" is loaded into the address register AR.

This has the advantage that without any change of the instruction information II defined by the manufacturer of the computing module 8 the address mode extension module 12 enable a particularly efficient additional address mode of the computing module 8 to be obtained in order to access memory locations of the program memory 9 or the data memory 10. The available tools can be used in order to program the program code PC stored in the program memory 9. Moreover, since the instruction information II specified by the manufacturer are maintained, parts of the program code PC which already exist in other data carriers can be included in the program code PC stored in the program memory 9.

It is to be noted that with the aid of the address mode extension module 12 arbitrary address incrementations and address decrementations using different offset values (for example +1 , +3 , +10 . . . ; −1, −5, −12) are possible. Likewise, the address incrementation or address incrementation may be performed only before or after a write access or only before or after a read access.

In a second example of use of the embodiment shown in FIG. 1 it is assumed that the desired mode of operation of the data carrier 1 requires a program code PC with an effective address mode, in which a subprogram for accessing memory locations is to be called by means of two different subprogram-call program code lines PCZ of the program code PC. When this subprogram is called by a first subprogram-call program code line PCZ of the program code PC numerical values should be loaded from memory locations of the program memory 9 into the accumulator A and when this subprogram is called by a second subprogram-call program code line PCZ of the program code PC numerical values should be loaded from memory locations of the data memory 10 into said accumulator A.

However, the definition of the instruction information II by the manufacturer of the microprocessor 80C51 specifies the instruction information II="MOVC" for a MOVE command from a memory location of the program memory 9 and the instruction information II="MOV" for a MOVE command from a memory location of the data memory 10. Thus, in the case of conventional programming of the microprocessor 80C51, two very similar subprograms would have to be programmed and stored in the program memory 9 as program codes PC, which would be disadvantageous.

This effective address mode for the programming of the afore-mentioned subprogram can be obtained for the data carrier 1 shown in FIG. 1 in that a second additional address mode is identified by the numerical value "02" in the function register FR and a third additional address mode is identified by the numerical value "03" in the function register FR for the address mode extension module 12. For the call of the subprogram by the first subprogram-call program code line PCZ the numerical value "02" and for the call of the subprogram by the second subprogram-call program code line PCZ the numerical value "03" is loaded into the function register FR and the address information AI of the memory location to be accessed in the subprogram is loaded into the address register AR.

As already explained for the first example of use, the subprogram includes the program code line PCZ="MOV A, 80" in order to activate the address mode extension stage 15 for the access to the memory location identified by the address information AI stored in the address register AR.

If now after the call of the subprogram the program code line PCZ="MOV A, 80" is executed by the computing module 8 the address mode extension stage 15 is activated by the specific address information AI="80". The address mode extension stage 15 subsequently determines the numerical value "02" or "03" which forms the additional address mode information AAI stored in the function register FR and which identifies the program memory 9 or data memory 10 to be accessed.

When the function register FR contains the numerical value "02" the memory location of the program memory 9 identified by the address information AI stored in the address register AR is accessed with the aid of the access stage 11. On the other hand, when the function register FR contains the numerical value "03" the memory location of the data memory 10 identified by the address information AI stored in the address register AR is accessed with the aid of the access stage 11.

This has the advantage that the subprogram of the program code PC can be used for accessing memory locations of the program memory 9 as well as of the data memory 10, as a result of which memory space in the program memory 9 can be saved.

Figure 4:
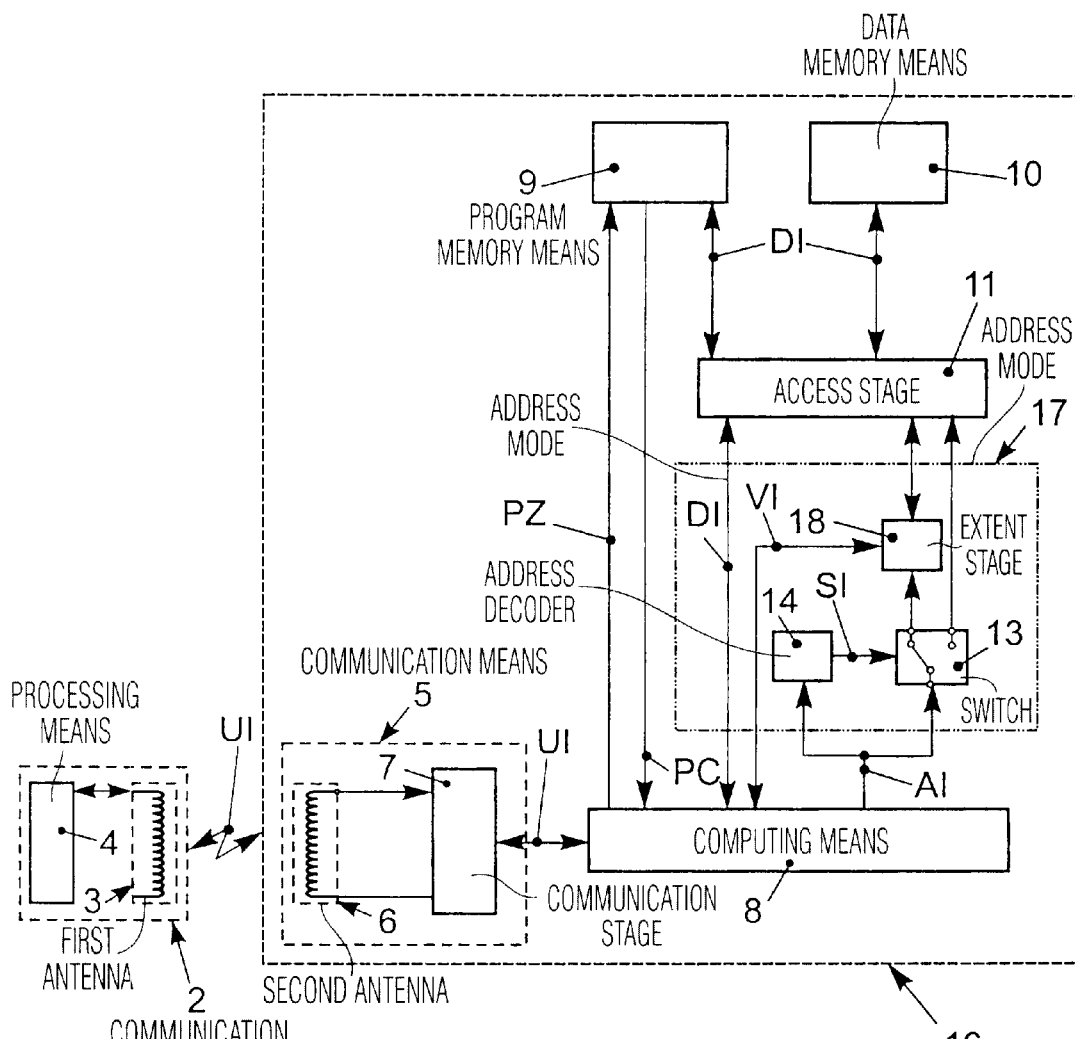
FIG. 4 is a block diagram of a data carrier provided with command extensions means in order to enable additional commands to be obtained.

FIG. 4 shows a data carrier 16 whose structure corresponds to that of the data carrier 1 shown in FIG. 1 but which includes command extension module 17 instead of the address mode extension module 12. The structure of the command extension module 17 corresponds to the structure of the address mode extension module 12 but instead of the address mode extension stage 15 a command extension stage 18 has been provided. The command extension stage 18 can also receive the data information DI supplied to the access stage 11 by the computing module 8.

When specific address information AI is present the command extension module 17 are adapted to change the processing of one of the program code lines by the computing module 8 and thus to enable an additional command for the computing module 8. This allows the command set of the computing module 11 to be extended, while at the same time the tools available with the computing module 11 can still be used.

In the present example a REPEAT command as additional command and a "REPEAT" register for this command are defined in the command extension module 17, which register is formed by a memory location of the data memory 10, which memory location has the specific address information AI="81". When the computing means 8 supply this specific address information AI="81" and data information DI to the command extension module 17 the program count PZ of the computing module 8 for the next program code line PCZ to be executed is stopped a number of times corresponding to the numerical value of the data information DI, which will be described in more detail hereinafter.

The execution of the additional REPEAT command is explained by an example of the processing of the program code PC stored in the program memory 9 of the data carrier 16. In accordance with the task envisaged in the present example of use it is assumed that the desired mode of operation of the data carrier 1 requires a program code PC with effective command information BI, where for a given state of processing of the received transmission information UI the computing module 8 should wait for a given time interval, which time interval is defined by 30 times the duration of a processing clock period of the computing module 8.

The manufacturer of the microprocessor 80C51 has defined command information BI="NOP" (No Operation), which causes the microprocessor 80C51 to wait for the duration of a processing clock period. To achieve the task envisaged in the present example of use with conventional programming of the computing module 8, this would require the inclusion of 30 program code lines PCZ="NOP" in the program code. To achieve the task it would also be possible to include a program loop with a loop counter in the program code PC, which loop would require about 10 program code lines PCZ.

In order to achieve the task envisaged in the example of use the program memory 9 in the data carrier 16 contain only the program code line PCZ="MOV REPEAT, #30" followed by the program code line PCZ="NOP" in the program code PC.

When the program count PZ of the computing module 8 for example has the numerical value "1221" and for this program count PZ the computing module 8 detect the program code line PCZ="MOV REPEAT, #30" in the program memory 9, the computing module 8 supply the address information AI="81" and the data information DI="30" to the command extension module 17. The address decoder 14 identifies the address information AI="81" as specific address information AI and supplies switch information SI to the switch 13, upon which the address information AI="81" is applied to the command extension stage 18. After processing of this program code line PCZ by the computing module 8 the program count PZ is incremented to the numerical value "1222" by the computing means 8 and the program code line PCZ="NOP" stored in the program memory 9 for said program count PZ is detected by the computing module 8 and is executed.

The address information AI="81" activates a hardware module in the command extension stage 18, which in accordance with the data information DI="30" supplies change information VI to the computing module 8 during the next 30 processing clock periods of the computing module 8. The change information VI causes the program count PZ in the computing module 8 to be reset to the numerical value "1222" after the incrementation to the numerical value "1223" by the computing module 8, as a result of which the computing module 8 again detect and process the program code line PCZ="NOP".

When after the time interval of 30 processing clock periods the command extension module 18 no longer supply any change information VI to the computing module 8 the processing of the program code PC stored in the program memory 9 is continued with the program code line PCZ which corresponds to the numerical value "1223".

This has the advantage that, as a result of the additional REPEAT command, a particularly efficient programming of the task in accordance with the example of use is possible, which enables the memory space in the program memory 9 as well as the power consumption of the data carrier 16 during the processing of the program code PC to be reduced. An additional advantage is that during programming of the program code PC the available tools can be utilized because the manufacturer's instruction information II has not been changed.

A further additional command could be activated for example in that the specific address information AI="82" is applied to the command extension module 17. Thus, a multitude of possible additional commands will be evident to one skilled in the art, enabling the command set laid down by the manufacturer of the computing module 8 to be extended and to be adapted to the given situation of use.

It is to be noted that in a further additional address mode an address information table stored in the program memory 9 or the data memory 10 could be used for accessing the memory locations. The additional address mode information ZAAI could then identify one of the entries in the address information table, thus enabling the address information AI entered in this entry of the address information table to be used as additional address information ZAI for accessing a memory location. Likewise, the additional address information ZAI determined by an addition of this address information AI entered into the address information table to address information AI contained in the program code line PCZ could be used for accessing a memory location. These additional address modes would enable the program code PC to be further optimized.

It is to be noted that a data carrier may include both address mode extension modules and command extension module. Advantageously, this would make it possible to provide only one address decoder and one switch for the address mode extension module and the command extension module.

It is to be noted that the command extension stage 18 could read out an additional command register which basically serves the same function as the function register FR in the address mode extension stage 15 and which could be used to define additional command information. In that case the numerical value stored in the additional command register could represent one of a plurality of possible additional commands and identify these for the command extension stage 18.

It is to be noted that the computing module 8 may, for example, also supply status information about the status of the processing state in the computing module 8 to the command extension stage 18 and the change information VI supplied by the command extension stage 18 could be modified in accordance with the status information applied to it.

What is claimed is:

1. A data carrier for the communication of transmission information to a communication station, including program memory means for the storage of a program code including instruction information and associated address information in at least one program code line, data memory means for the storage of data information computing means for the execution of the stored program code in order to process the communicated transmission information, wherein for each program code line, address mode information included in the instruction information and the associated address information can be determined and can be processed in order to access a memory location of the program memory means or the data memory means, and address mode extension means, in the presence of specific address information, for determining stored additional address mode information.

2. A data carrier as claimed in claim 1, wherein the in the presence of additional address mode information which identifies the program memory or the data memory and the address mode extension means are adapted to access the memory location identified by the additional address mode information.

3. A data carrier as claimed in claim 1, wherein in the presence of additional address mode information which identifies an entry in an address information table stored in the program memory means or the data memory and the address mode extension means are adapted to access the memory location identified by the address information of the entry of the address information table or to access the memory location identified by the address information of the entry of the address information table plus the additional address mode information.

4. A data carrier as claimed in claim 1, wherein in the presence of additional address mode information which identifies an address incrementation or and address decrementation and the address mode extension means are adapted to, respectively, increment or decrement additional address information, respectively, before or after an access to the memory location identified by the additional address information.

5. A data carrier as claimed in claim 4, wherein in the presence of additional address mode information which identifies the address incrementation or the address decrementation and a write access or a read access, respectively, and the address mode extension means are adapted to perform the address incrementation or the address decrementation, respectively, only before or only after, respectively, a write access or a read access to the memory location identified by the additional address information.

6. A data carrier for the communication of transmission information to communication station, including program memory means for the storage of a program code including instruction information and associated address information in at least one program code line, data memory means for the storage of data information computing means for the execution of the command information included in the instruction information for each program code line of the stored program code, in order to process the communicated transmission information, and command extension means, in the presence of specific address information, for changing the processing of one of the program code lines by the computing means.

7. The data carrier of claim 1 or 6 is an integrated circuit.

* * * * *